(12) United States Patent
Williams

(10) Patent No.: US 8,152,462 B1
(45) Date of Patent: Apr. 10, 2012

(54) CARD SEAL WITH CONICAL FLEXIBLE SEAL

(75) Inventor: Gregory C Williams, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 482 days.

(21) Appl. No.: 12/543,796

(22) Filed: Aug. 19, 2009

(51) Int. Cl.
*F01D 11/02* (2006.01)

(52) U.S. Cl. ...................... 415/231; 415/173.1; 277/355

(58) Field of Classification Search ............... 415/173.1, 415/173.4, 174.4, 231, 173.7, 174.2; 277/355, 277/411, 412
See application file for complete search history.

(56) References Cited

U.S. PATENT DOCUMENTS

| | | | | |
|---|---|---|---|---|
| 5,401,036 A | * | 3/1995 | Basu .............................. | 277/355 |
| 5,884,918 A | * | 3/1999 | Basu et al. .................... | 277/355 |
| 6,254,344 B1 | * | 7/2001 | Wright et al. ................. | 415/231 |
| 6,267,381 B1 | | 7/2001 | Wright | |
| 6,343,792 B1 | | 2/2002 | Shinohara et al. | |
| 6,565,094 B2 | * | 5/2003 | Wright et al. ................. | 277/355 |
| 6,685,427 B1 | * | 2/2004 | Dhar et al. ................. | 415/173.3 |
| 6,736,597 B2 | | 5/2004 | Uehara et al. | |
| 6,742,782 B2 | * | 6/2004 | Beichl .......................... | 277/409 |
| 6,811,154 B2 | * | 11/2004 | Proctor et al. ................ | 277/355 |
| 6,874,788 B2 | | 4/2005 | Kono | |
| 6,935,631 B2 | | 8/2005 | Inoue | |
| 6,976,680 B2 | | 12/2005 | Uehara et al. | |
| 7,066,468 B2 | | 6/2006 | Uehara et al. | |
| 7,201,378 B2 | | 4/2007 | Kono | |
| 7,261,515 B2 | | 8/2007 | Nishimoto et al. | |
| 7,419,164 B2 | | 9/2008 | Awtar et al. | |
| 7,438,526 B2 | * | 10/2008 | Enderby ....................... | 415/231 |
| 7,578,509 B2 | * | 8/2009 | Grondahl ..................... | 277/355 |
| 7,976,026 B2 | * | 7/2011 | Verma et al. .................. | 277/355 |
| 2002/0105146 A1 | | 8/2002 | Uehara et al. | |
| 2004/0256810 A1 | | 12/2004 | Nakano et al. | |
| 2005/0194745 A1 | | 9/2005 | Hogg | |
| 2006/0208427 A1 | | 9/2006 | Wright et al. | |

* cited by examiner

*Primary Examiner* — Edward Look
*Assistant Examiner* — Liam McDowell
(74) *Attorney, Agent, or Firm* — John Ryznic

(57) ABSTRACT

A card seal with an annular arrangement of cards that are positioned within an annular groove of a casing, and a conical flexible seal is secured to the casing on the low pressure side of the cards. The cards and the flexible seal both includes slanted surfaces that interact during operation such that the flexible seal gap decreases with the rotor shaft and the cards are secured within the annular groove during assembly and installation of the card seal. The flexible seal blocks leakage through the cards and includes an axial extending inner end that can include an abradable material to allow for rub with the shaft while decreasing the gap to prevent leakage across the cards.

6 Claims, 1 Drawing Sheet

CARD SEAL WITH CONICAL FLEXIBLE SEAL

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a dynamic seal, and more specifically to card seal for use in turbo machines such as gas turbines, steam turbines, compressors, pumps, etc.

2. Description of the Related Art including information disclosed under 37 CFR 1.97 and 1.98

A gas turbine engine includes a compressor and a turbine each having multiple rows of rotor blades interspaced between stator or guide vanes. In-between each row or stage, a large pressure differential is formed. In the compressor, the pressure increases in the flow direction while in the turbine the pressure decreases. The pressure differential between adjacent stages in the compressor is smaller than in the turbine because of the greater number of stages used in the compressor.

A dynamic seal is used between the rotor and the stator of the turbomachine to limit leakage in order to improve the efficiency of the turbo machine. In the turbine, the leakage is from the hot gas flow passing through the turbine. Hot gas leaking into the rim cavity will expose the rotor disks to the extreme hot temperature. Thus, better seals reduce leakage to increase performance of the turbo machine and to prevent over-exposure of turbomachine parts to excessive temperatures. In one example, the rotor disks in the turbine are made from a high strength material different than the rotor blades or stator vanes that would develop cracks due to thermal stress loads if exposed to high temperature from excessive hot gas leakage into the adjacent rim cavity. This is why purge air is often used in the rim cavities to push out or dilute and hot gas flow leakage that leaks through the dynamic seal and into the rim cavity.

In a turbine of a gas turbine engine, labyrinth seals or brush seals are used for the dynamic seals. In some cases, a combination of brush and labyrinth seals is used because of the characteristics of each. A labyrinth seal makes a good seal at relatively high rotational speeds while the brush seal is best for relatively low rotational speeds. This is due to the use of brushes that rub against the rotating part formed by the dynamic seal. At higher rotational speeds, the brushes will wear out early. Brush seals have less leakage than labyrinth seals, but wear out easily when rubbing at higher speeds. One reason why a turbine uses combinations of labyrinth and brush seals is due to engine transients, which is when the engine is stopped and then restarted. The rotor shaft and the engine casing are made of different materials that have different coefficients of thermal expansion. Thus, the parts grow in a radial direction at different rates due to heat transfer to or from the part. Labyrinth seals are also capable of sealing much higher pressure differentials than brush seals.

A card seal is formed of a number of flat leafs or cards arranged around a rotor shaft in an annular formation in which a gap formed between adjacent cards due to surface irregularities and is generally parallel to the rotor shaft axis. Each plate is capable of sliding over adjacent cards so as to maintain contact with the rotor shaft surface or float on top thereof. An outer end of the cards is held in a casing while the inner ends float or make contact with the outer surface of the rotor shaft. One side of the cards is exposed to the high pressure side while the other side is exposed to the low pressure. U.S. Pat. No. 6,736,597 issued to Uehara et al on May 18, 2004 and entitled AXIS SEAL MECHANISM AND TURBINE shows one such card seal. This card seal will allow for too much leakage through the small gaps formed between adjacent cards to be useful in the gas turbine engine.

Leaf or card seals have been developed in order to provide a better seal that includes benefits from both the lab seals and the brush seals. Card seals are primarily utilized to maintain a pressure barrier between two cavities created by a static structure, a moving structure and separated by the seal structure. Specifically, a static cylindrical case, a rotor and the seal are some examples. Whereas a solid seal structure—such as a ring seal—would undergo severe contact loads due to rotor lateral excursions, card seals are designed to be compliant and either tolerates small contact or bend out of the rotor path.

The prior art card seal structures includes a plurality of thin cards arranged so that the weak axis of bending is presented in the direction of rotor motion. A tilt or lean in direction of motion is included so that contact occurs at an angle to the direction of motion. The net effect of these two features is to minimize wear by reduced contact load and actualize displacement due to boundary layer air pressure which will provide an air cushion between moving surface and free edge of the cards if a flexible card is used.

Therefore, by design the plurality of cards that form the card seal provides for a direct leakage path between the cards. For this reason, the cards are reinforced along the plate longitudinal axis by either changing the plate number density or forming a localized deformation such as dimpling or ridges on each thin plate that align with each other. Prior art card seals include a plate with a raised middle portion that extends along the longitudinal axis of the plate that will reinforce the plate and provide a barrier to the direct leakage flow path between the flat cards. The leakage area in this card seal is reduced by the cross sectional area of the ridge. However, the ridge or stamped process may effectively increase the weak axis inertia and impede the plate's ability to bend away from the rotor lateral excursions. In other words, the cards having the ridges for added strength will produce a more rigid (or, less flexible) card seal.

Since card seals are formed from an annular arrangement of loose fitting cards or leafs, assembling the card seal can be difficult in that individual cards can fall out of place during the assembly process. Also, during operation of the card seal, especially for a card seal used in a relatively high temperature environment such as a gas turbine engine, the case that holds the card seal could grow thermally much more than the rotor shaft in which the card seal forms the seal. Thus, the radial distance between the card seal case and the card seal cards inner ends could expand enough to significantly reduce the sealing effect of the card seal.

BRIEF SUMMARY OF THE INVENTION

It is an object of the present invention to provide for a card seal with better leakage control through the cards than in the prior art card seals.

It is another object of the present invention to provide for a card seal that can block the air pressure passing between adjacent cards and under the cards.

It is another object of the present invention to provide for a card seal with means to retain the cards during assembly and operation of the card seal.

It is another object of the present invention to provide for a card seal a flexible seal assembly that will decrease leakage flow and bias the cards in an axial and a radial outward direction during operation.

The above described objectives and more are achieved with the card seal of the present invention which includes a plurality of thin cards arranged around the rotor in which the cards have an inner end of less axial length than the outer end that forms a slanted surface in-between on the low pressure side of the cards. A conical flexible seal is secured to the card seal casing on the low pressure side of the card seal and includes a slanted middle section and an axial aligned conical section on the inner end that forms a gap with the rotor shaft.

A pressure difference forces the cards toward the conical flexible seal such that the slanted surfaces of the cards abut the slanted middle portion of the flexible seal to force the cards in a radial outward direction while the cards force the axial aligned conical section of the conical flex seal toward the rotor shaft surface to close a gap formed here. The conical flex seal blocks leakage flow through the cards to improve the card seal effectiveness and secures the cards in place during assembly.

DETAILED DESCRIPTION OF THE INVENTION

Figure 1:
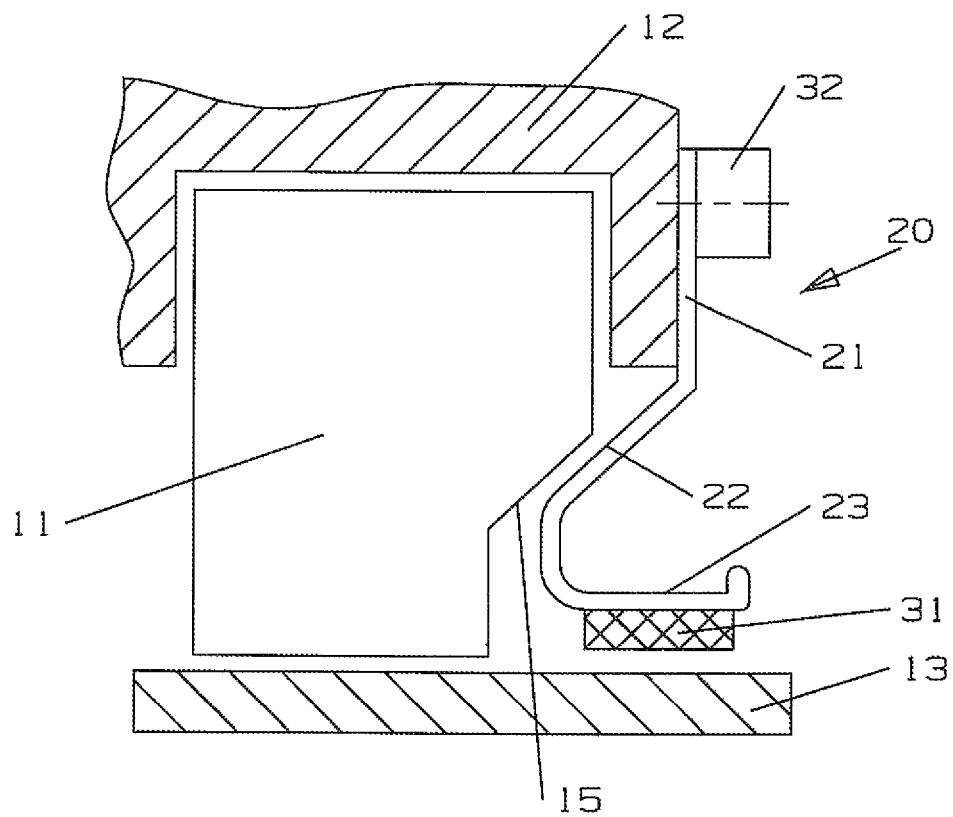
FIG. 1 shows a cross section side view of a card seal of the present invention.
Figure 2:
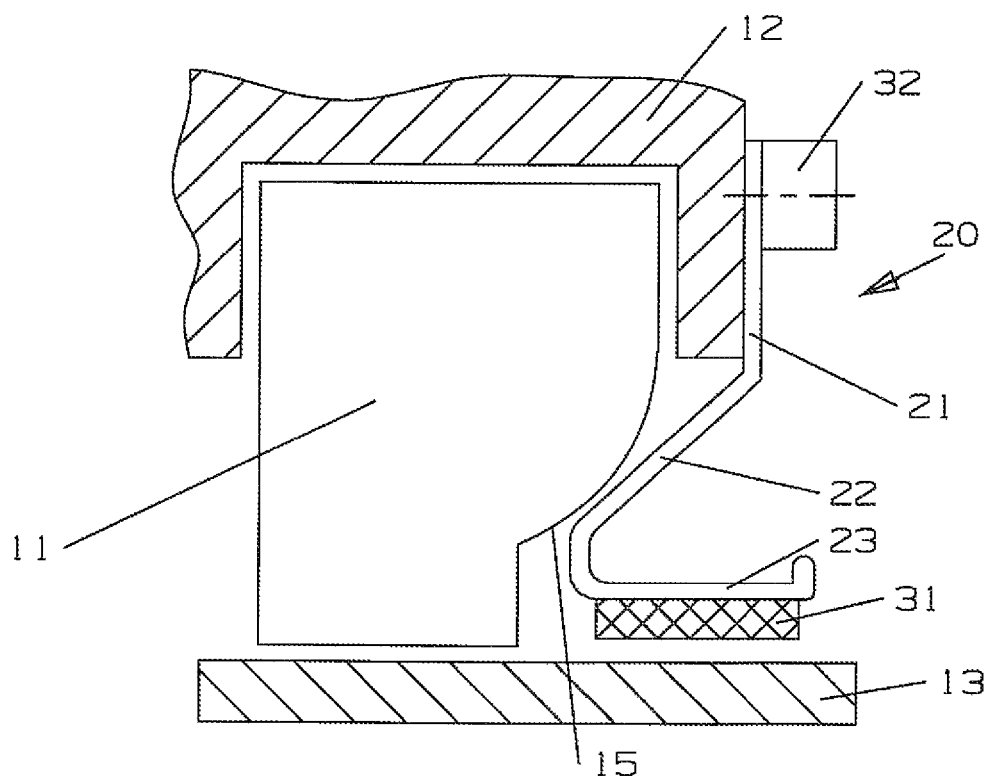
FIG. 2 shows a cross section view of a second embodiment of the card seal of the present invention.

The card or leaf seal of the present invention is shown in FIG. 1 and includes a plurality of thin flat cards 11 in an annular arrangement around a rotor shaft 13 or other rotor in which the card seal is used. The cards 11 are placed within an annular inward facing groove formed within a card seal casing 12. Each card 11 is shaped the same and includes a wider upper end than on the inner end with a slanted surface 15 in-between the inner end section and the outer end section. The slanted surface 15 on the cards can be flat as shown in FIG. 1, or the slant can be slightly curved in a convex manner in which the curvature bulges outward.

A conical shaped flexible seal 20 is secured to a side of the casing 12 by a ring clamp using a plurality of fasteners or other means to secure the flexible seal 20 to the casing. The radial aligned outer end 21 part of the flex seal is sandwiched between the casing 12 and an annular ring to prevent leakage between any fasteners that secure the conical flex seal 20 to the casing 12. The conical shaped flexible seal 20 includes a radial aligned outer end 21, a conical axial aligned inner end 23 and a slanted middle section 22 that forms a transition between the radial extending outer end 21 and the axial extending inner end 23. The slanted section 22 of the conical flex seal 20 has the same slant as the slanted section of the cards 11. As in the card seal slanted side 15, the flex seal slanted section 22 can have a convex curvature that bulges outward toward the card seal. Only one of the slanted surfaces 15 and 22 would have the convex curvature and not both if a curvature was used for the card seal. The piece with the curvature would be the piece that would be easier to manufacture with the curvature. An abradable material 31 can be secured to an inner surface of the axial aligned inner end 23 of the flex seal to reduce wear and friction between the rotor shaft 13 surface and the flex seal 20. If the abradable material 31 is not used, then a gap formed between the axial aligned inner end 23 and the rotor shaft 13 surface will be at a minimum. Without the abradable material 31, the axial inner end 23 would have less of a diameter such that the gap between the rotor shaft would be the same as with the abradable material 31.

The card seal includes a high pressure side (left side of FIG. 1) and a low pressure side (right side). The slanted surfaces of the cards 11 and the flex seal middle section 22 are of such size and shape that the cards—when exposed to a differential pressure—will be forced toward the flex seal 20 such that the slanted surfaces will abut. When the cards 11 abut against the flex seal slanted surface 22, the flex seal will be flexed such that the axial aligned inner end 23 will be displaced radial inward to close the gap between the rotor shaft 13 surface. Thus, the flex seal will block air passing between the cards and under the cards to improve the card seal sealing capability. Presence of the conical flex seal 20 will also function to reduce leakage flow through the cards 11. The conical flex seal 20 also functions to retain the cards within the annular groove of the casing during assembly and installation of the card seal.

The angle of the slanted surfaces on the cards and the flexible seal are around 45 degrees as measured from the rotor axis, but may be changed depending on the needs of the particular application. The stiffness of the conical flex seal 20 depends on the material of the flex seal, the thickness of the material, the radial position of the entire assembly, and the angle of the cone.

The cards 11 are assembled into the annular groove of the casing 12 and then the conical flex seal 20 secured in place. The conical flex seal is made from a single piece, but could be made from separate pieces welded or bonded together to form one integral piece. Also, the conical flex seal is made to be flexible to produce the above described effects. For use in a gas turbine engine, the cards and the conical flex seal will be made from a high temperature resistant material. In the prior art, a series of labyrinth seals and brush seals are used for an interstage seal formed between an inner shroud of a row of stator vanes and a surface of the rotor shaft of the turbine. The card seal of the present invention is intended to be used in a turbine section of the engine where the prior art labyrinth seals and brush seals are used. Also, the card seal of the present invention can be used to replace a combination of labyrinth seal and brush seal that form a series of seals used to control leakage across gaps that change during engine transients. Because of the flexibility of the card seal to radial changes in the gaps, the card seal can be used to replace both of these two prior art seals in the turbine section environment.

I claim the following:
1. A card seal comprising:
   a card seal casing secured to a stator;
   an annular inward facing groove formed within the casing;
   a plurality of cards stacked against each other within the annular groove of the casing to form an annular arrangement around a rotor shaft;
   the cards having a radial inner end with a shorter axial length than a radial outer end and a slanted transition surface between the two ends;
   a flexible seal secured on a low pressure side of the card seal, the flexible seal having an axial extending inner end that forms a gap with the rotor shaft; and,
   the flexible seal having a slanted surface that abuts against the slanted transition surface of the cards to force the axial inner end radially inward and shorten the gap during a differential pressure acting across the card seal.

2. The card seal of claim 1, and further comprising:

the flexible seal is a conical flexible seal and functions to retain the cards within the annular groove during assembly or installation of the card seal.

3. The card seal of claim 1, and further comprising:

the slanted transition surface on the cards and the slanted surface of the flexible seal are angled at around 45 degrees from an axis of rotation of the rotor shaft.

4. The card seal of claim 1, and further comprising:

an inner surface of the axial extending inner end of the flexible seal includes an abradable material to rub against the rotor shaft.

5. The card seal of claim 1, and further comprising:

a small gap is formed between the cards and the annular groove on the forward and aft sides and the radial outer end so that the cards are loosely fitted within the annular groove during assembly and installation; and, the flexible seal holds the cards within the annular groove.

6. A gas turbine engine comprising:

a turbine having a row of stator vanes;

a row of rotor blades located adjacent to the row stator vanes;

the row of rotor blades rotatably secured to a rotor shaft of the engine;

an interstage seal extending from an inner shroud of the row of stator vanes and forming a seal with a surface of the rotor shaft;

the interstage seal comprising a card seal comprising: a card seal casing secured to a stator; an annular inward facing groove formed within the casing; a plurality of cards stacked against each other within the annular groove of the casing to form an annular arrangement around a rotor shaft; the cards having a radial inner end with a shorter axial length than a radial outer end and a slanted transition surface between the two ends; a flexible seal secured on a low pressure side of the card seal, the flexible seal having an axial extending inner end that forms a gap with the rotor shaft; and, the flexible seal having a slanted surface that abuts against the slanted transition surface of the cards to force the axial inner end radially inward and shorten the gap during a differential pressure acting across the card seal.

\* \* \* \* \*